(12) United States Patent
Meng et al.

(10) Patent No.: US 11,341,718 B2
(45) Date of Patent: May 24, 2022

(54) METHOD AND APPARATUS FOR GENERATING 3D JOINT POINT REGRESSION MODEL

(71) Applicant: BEIJING BAIDU NETCOM SCIENCE AND TECHNOLOGY CO., LTD., Beijing (CN)

(72) Inventors: Qingyue Meng, Beijing (CN); Chen Zhao, Beijing (CN)

(73) Assignee: BEIJING BAIDU NETCOM SCIENCE AND TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 17/021,218

(22) Filed: Sep. 15, 2020

(65) Prior Publication Data
US 2021/0225069 A1 Jul. 22, 2021

(30) Foreign Application Priority Data
Jan. 20, 2020 (CN) .......................... 202010064261.5

(51) Int. Cl.
*G06N 20/00* (2019.01)
*G06T 17/00* (2006.01)

(52) U.S. Cl.
CPC ............. *G06T 17/00* (2013.01); *G06N 20/00* (2019.01); *G06T 2210/41* (2013.01)

(58) Field of Classification Search
CPC ............... G06T 17/00; G06T 2210/41; G06T 2207/10004; G06T 2207/20081; G06T 2207/20084; G06T 2207/30196; G06T 7/75; G06T 17/20; G06T 7/50; G06T 7/70; G06T 2207/20044; G06N 20/00
See application file for complete search history.

(56) References Cited

U.S. PATENT DOCUMENTS 5,625,577 A * 4/1997 Kunii ................... B25J 9/1671
                                                      318/561
10,853,970 B1 * 12/2020 Akbas ..................... G06T 7/73
(Continued)

FOREIGN PATENT DOCUMENTS

JP H04270372 A 9/1992

OTHER PUBLICATIONS

Ren et al., SRN: Stacked Regression Network for Real-time 3D Hand Pose Estimation, 2019 (Year: 2019).*
(Continued)

*Primary Examiner* — Phong X Nguyen
(74) *Attorney, Agent, or Firm* — Lathrop GPM LLP

(57) ABSTRACT

A method and apparatus for generating a 3D joint point regression model are provided. An embodiment of the method includes: acquiring a sample image with a 2D label and a sample image with a 3D label; training part of channels of an output layer of a basic 3D joint point regression model, with the sample image with the 2D label as a first input, and with a joint point heat map set corresponding to the 2D label as a first expected output; and training all of the channels of the output layer, with the sample image with the 3D label as a second input, with a joint point heat map set corresponding to the 3D label as a first part output of a second expected output and with a joint point depth information map set corresponding to the 3D label as a second part output of the second expected output.

19 Claims, 7 Drawing Sheets

(56) References Cited

U.S. PATENT DOCUMENTS

| | | | |
|---|---|---|---|
| 2019/0019014 A1* | 1/2019 | Ye | G06K 9/6256 |
| 2019/0147220 A1* | 5/2019 | Mccormac | G06K 9/00208 |
| | | | 382/103 |
| 2020/0126297 A1* | 4/2020 | Tian | G06T 7/55 |
| 2020/0311574 A1* | 10/2020 | Andrade Silva | G06N 20/00 |
| 2020/0342270 A1* | 10/2020 | Biswas | G06T 7/70 |
| 2020/0364554 A1* | 11/2020 | Wang | G06N 3/08 |
| 2021/0124425 A1* | 4/2021 | Liu | G06T 7/74 |
| 2021/0248772 A1* | 8/2021 | Iqbal | G06T 7/50 |

OTHER PUBLICATIONS

European Patent Application No. 21152567.0, European Search Report dated Jul. 2, 2021, 11 pages.
Chaaraoui et al., A review on vision techniques applied to Human Behaviour Analysis for Ambient-Assisted Living, Expert Systems with Applications 39, Elsevier Ltd. 2012, pp. 10873-10888.
Zhou et al., Towards 3D Human Pose Estimation in the Wild: a Weakly-supervised Approach, IEEE International Conference on Computer Vision, 2017, pp. 398-407.
Japanese Patent Application No. 2021-006367 Notice of Reasons for Refusal dated Mar. 8, 2022 4 pages.
English translation of Japanese Patent Application No. 2021-006367 Notice of Reasons for Refusal dated Mar. 8, 2022, 4 pages.

\* cited by examiner

METHOD AND APPARATUS FOR GENERATING 3D JOINT POINT REGRESSION MODEL

CROSS-REFERENCE TO RELATED APPLICATIONS

This application claims priority to Chinese Patent Application No. 202010064261.5, filed with the China National Intellectual Property Administration (CNIPA) on Jan. 20, 2020, the contents of which are incorporated herein by reference in their entirety.

TECHNICAL FIELD

The present disclosure relates to the field of computer technology, specifically to the field of three-dimensional (3D) limb regression technology, and more specifically to a method and apparatus for generating a three-dimensional (3D) joint point regression model, and a method and apparatus for generating 3D joint point coordinates.

BACKGROUND 3D limb regression technology based on mixed data refers to the simultaneous use of two-dimensional (2D) labeling data and three-dimensional (3D) labeling data for learning when using deep learning technology for three-dimensional 3D limb regression. Nowadays, with the development of deep learning technology, its applications in various fields are becoming more and more extensive, such as regression of key points of various objects or bodies. Deep learning technology relies on accurately labeled data, while the labeling of 3D data is much more difficult than the labeling of 2D data. Therefore, at present, academic and industrial circles mostly study the regression of 2D key points, while the study on 3D limb learning is relatively rare.

SUMMARY

Embodiments of the present disclosure provide a method and apparatus for generating a 3D joint point regression model, and a method and apparatus for generating 3D joint point coordinates.

In a first aspect, some embodiments of the present disclosure provide a method for generating a 3D joint point regression model, the method includes:

acquiring a sample image with a 2D label and a sample image with a 3D label; training part of channels of an output layer of a basic 3D joint point regression model, with the sample image with the 2D label as a first input, and with a joint point heat map set corresponding to the 2D label as a first expected output; and training all of the channels of the output layer of the basic 3D joint point regression model, with the sample image with the 3D label as a second input, and with a joint point heat map set corresponding to the 3D label as a first part output of a second expected output and with a joint point depth information map set corresponding to the 3D label as a second part output of the second expected output.

In some embodiments, the training the part of the channels of the output layer of the basic 3D joint point regression model, with the sample image with the 2D label as the first input, and with the joint point heat map set corresponding to the 2D label as the first expected output, includes: training the part of the channels of the output layer of the basic 3D joint point regression model, with the sample image with the 2D label as the first input, with the joint point heat map set corresponding to the 2D label as the first expected output, and with a geometric constraint loss function corresponding to the sample image with the 2D label as a loss function corresponding to the first expected output.

In some embodiments, the training all of the channels of the output layer of the basic 3D joint point regression model, with the sample image with the 3D label as the second input, and with the joint point heat map set corresponding to the 3D label as the first part output of the second expected output and with the joint point depth information map set corresponding to the 3D label as the second part output of the second expected output, includes: training all of the channels of the output layer of the basic 3D joint point regression model, with the sample image with the 3D label as the second input, with the joint point heat map set corresponding to the 3D label as the first part output of the second expected output and with the joint point depth information map set corresponding to the 3D label as the second part output of the second expected output, with a weighted value of a geometric constraint loss function corresponding to the sample image with the 3D label as a loss function corresponding to the first part output of the second expected output, and with a weighted value of an Euclidean distance loss function corresponding to the sample image with the 3D label as a loss function corresponding to the second part output of the second expected output.

In some embodiments, the geometric constraint loss function comprises: an Euclidean distance between a length ratio of a predicted bone and an average value of length ratios of bones in a sample image set; wherein the predicted bone is a bone in the joint point heat map set output by the basic 3D joint point regression model; the length ratio of a predicted bone is: a ratio of a length of a predicted bone corresponding to a sample image in the sample image set selected in a single training to a length of a bone in a reference data set; and the length ratios of the bones in the sample image set are: ratios of lengths of all predicted bones corresponding to all sample images in the sample image set selected in the single training to the length of the bone in the reference data set.

In some embodiments, the Euclidean distance loss function corresponding to the sample image with the 3D label includes: an Euclidean distance between depth information in the joint point depth information map set output by the basic 3D joint point regression model and joint point depth information labeled in the 3D label, when the sample image with the 3D label is used as the second input.

In some embodiments, the basic 3D joint point regression model comprises any one of: an initial 3D joint point regression model; or a pre-trained 3D joint point regression model obtained by training an initial 3D joint point regression model using the sample image with the 2D label.

In a second aspect, some embodiments of the present disclosure provide method according to claim 6, wherein the pre-trained 3D joint point regression model is obtained by: training the initial 3D joint point regression model, with the sample image with the 2D label as an input, with the 2D label as an expected output, and with an Euclidean distance between a joint point coordinate determined based on the joint point heat map set output by the joint point regression model and a 2D joint point coordinate in the 2D label as a loss function.

In some embodiments, the method further includes: determining an action parameter of the body based on the 3D joint point coordinates of the body; and generating, based on the action parameter of the body, prompt information prompting an action of the body.

In a third aspect, some embodiments of the present disclosure provide an apparatus for generating a 3D joint point regression model, the apparatus includes: a sample image acquisition unit, configured to acquire a sample image with a 2D label and a sample image with a 3D label; a part-channels training unit, configured to train part of channels of an output layer of a basic 3D joint point regression model, with the sample image with the 2D label as a first input, and with a joint point heat map set corresponding to the 2D label as a first expected output; and an all-channels training unit, configured to train all of the channels of the output layer of the basic 3D joint point regression model, with the sample image with the 3D label as a second input, and with a joint point heat map set corresponding to the 3D label as a first part output of a second expected output and with a joint point depth information map set corresponding to the 3D label as a second part output of the second expected output.

In some embodiments, the part-channels training unit is further configured to: train the part of the channels of the output layer of the basic 3D joint point regression model, with the sample image with the 2D label as the first input, with the joint point heat map set corresponding to the 2D label as the first expected output, and with a geometric constraint loss function corresponding to the sample image with the 2D label as a loss function corresponding to the first expected output.

In some embodiments, the all-channels training unit is further configured to: train all of the channels of the output layer of the basic 3D joint point regression model, with the sample image with the 3D label as the second input, with the joint point heat map set corresponding to the 3D label as the first part output of the second expected output and with the joint point depth information map set corresponding to the 3D label as the second part output of the second expected output, with a weighted value of a geometric constraint loss function corresponding to the sample image with the 3D label as a loss function corresponding to the first part output of the second expected output, and with a weighted value of an Euclidean distance loss function corresponding to the sample image with the 3D label as a loss function corresponding to the second part output of the second expected output.

In some embodiments, the geometric constraint loss function in the part-channels training unit or the all-channels training unit comprises: an Euclidean distance between a length ratio of a predicted bone and an average value of length ratios of bones in a sample image set; where the geometric constraint loss function in the part-channels training unit or the all-channels training unit comprises: an Euclidean distance between a length ratio of a predicted bone and an average value of length ratios of bones in a sample image set; the length ratio of a predicted bone is: a ratio of a length of a predicted bone corresponding to a sample image in the sample image set selected in a single training to a length of a bone in a reference data set; and the length ratios of the bones in the sample image set are: ratios of lengths of all predicted bones corresponding to all sample images in the sample image set selected in a single training to the length of the bone in the reference data set.

In some embodiments, the Euclidean distance loss function corresponding to the sample image with the 3D label in the all-channels training unit includes: an Euclidean distance between depth information in the joint point depth information map set output by the basic 3D joint point regression model and joint point depth information labeled in the 3D label, when the sample image with the 3D label is used as the second input.

In some embodiments, the basic 3D joint point regression model in the part-channels training unit or the all-channels training unit includes any one of: an initial 3D joint point regression model; or a pre-trained 3D joint point regression model obtained by training an initial 3D joint point regression model using the sample image with the 2D label.

In some embodiments, the pre-trained 3D joint point regression model is obtained by: training the initial 3D joint point regression model, with the sample image with the 2D label as an input, with the 2D label as an expected output, and with an Euclidean distance between a joint point coordinate determined based on the joint point heat map set output by the joint point regression model and a 2D joint point coordinate in the 2D label as a loss function.

In a fourth aspect, some embodiments of the present disclosure provide an apparatus for generating 3D joint point coordinates, the apparatus includes: an image acquisition unit, configured to acquire an image containing a body; an image input unit, configured to input the image into a trained 3D joint point regression model to obtain a joint point heat map set and a joint point depth information map set output by the trained 3D joint point regression model, wherein the trained 3D joint point regression model is obtained by training a basic 3D joint point regression model using the apparatus for generating a 3D joint point regression model according to any one of the above embodiments; and a coordinate determining unit, configured to determine 3D joint point coordinates of the body, based on the joint point heat map set and the joint point depth information map set.

In some embodiments, the apparatus further includes: an action parameter determining unit, configured to determine an action parameter of the body based on the 3D joint point coordinates of the body; and a prompt information generation unit, configured to generate, based on the action parameter of the body, prompt information prompting an action of the body.

In a fifth aspect, some embodiments of the present disclosure provide an electronic device/terminal/server, includes: at least one processor; a storage apparatus, for storing one or more programs; and the one or more programs, when executed by the one or more processors, cause the one or more processors to implement the method according to any one of the embodiments described above.

In a fifth aspect, some embodiments of the present disclosure provide a computer readable medium, storing a computer program thereon, the program, when executed by a processor, implements the method according to any one of the embodiments described above.

In the method and apparatus for generating a 3D joint point regression model provided by embodiments of the present disclosure, the method for generating a 3D joint point regression model includes: first acquiring a sample image with a 2D label and a sample image with a 3D label; then training part of channels of an output layer of a basic 3D joint point regression model, with the sample image with the 2D label as a first input, and with a joint point heat map set corresponding to the 2D label as a first expected output; and training all of the channels of the output layer of the basic 3D joint point regression model, with the sample image with the 3D label as a second input, and with a joint point heat map set corresponding to the 3D label as a first part output of a second expected output and with a joint point depth information map set corresponding to the 3D label as a second part output of the second expected output.

In this process, the sample image with the 2D label and the sample image with the 3D label are used to train part of the channels and all of the channels of the joint point regression model respectively. Parameters of the joint point regression model may be adjusted at the same time by using the sample image with 2D label and the sample image with 3D label, so that a joint point regression model having high prediction ability may be trained in the situation of that sample images with 3D label are limited, thereby improving the accuracy for subsequent generating a 3D joint point of an input image by the trained joint point regression model.

In some embodiments, an initial 3D joint point regression model is pre-trained using a sample image with 2D label to obtain the pre-trained 3D joint point regression model, and the pre-trained 3D joint point regression model is used as a basic 3D joint point regression model, further, a basic 3D joint point network is trained using the sample image with the 2D label and the sample image with the 3D label, and the trained 3D joint point regression model may be obtained. This process improves the efficiency of generating a trained 3D joint point regression model and the accuracy of generating a 3D joint point based on the trained 3D joint point regression model.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

Those skilled in the art shall also understand that although the terms "first", "second", etc. may be used herein to describe various inputs, expected outputs, some outputs, etc., these inputs, expected outputs, and some outputs should not be limited by these terms. These terms are only used to distinguish one input, expected output, and some output from other inputs, expected outputs, and some outputs.

Figure 1:
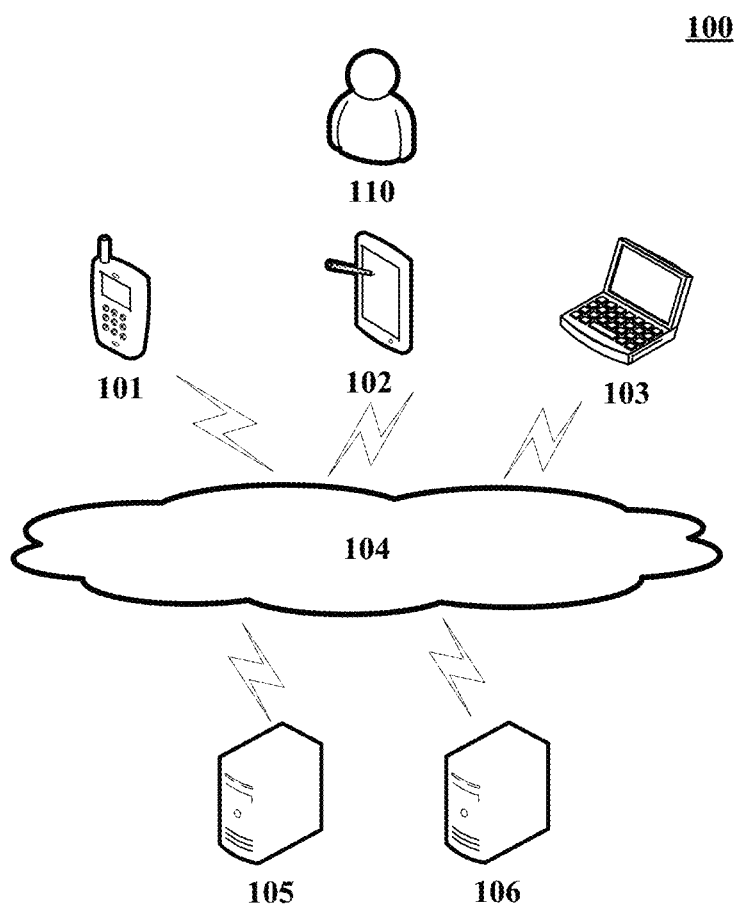
FIG. 1 is a diagram of an exemplary system architecture in which embodiments of the present disclosure may be implemented.

FIG. 1 illustrates an exemplary system architecture 100 of a method for generating a 3D joint point regression model or an apparatus for generating a 3D joint point regression model in which embodiments of the present disclosure may be implemented.

As shown in FIG. 1, the system architecture 100 may include terminal devices 101, 102, 103, a network 104 and servers 105, 106. The network 104 is used to provide a communication link medium between the terminal devices 101, 102, 103 and the servers 105, 106. The network 104 may include various types of connections, such as wired, wireless communication links, or optic fibers.

A user may use the terminal devices 101, 102, 103 to interact with the servers 105, 106 through the network 104 to receive or send messages and the like. Various communication client applications, such as translation applications, browser applications, shopping applications, search applications, instant messaging tools, email clients, or social platform software, may be installed on the terminal devices 101, 102, and 103.

The terminal devices 101, 102, and 103 may be hardware or software. When the terminal devices 101, 102, and 103 are hardware, they may be various electronic devices supporting browser applications, including but not limited to tablet computers, laptop portable computers, desktop computers and the like. When the terminal devices 101, 102, and 103 are software, they may be installed in the electronic devices listed above. They may be implemented as a plurality of software or software modules for providing distributed services, or as a single software or software module. The present disclosure is not specifically limited herein.

The server 105 or 106 may be a server that provides various services, for example, a backend server that supports browser applications on the terminal devices 101, 102, and 103. The backend server may process such as analyze a received request and other data, and feed back a processing result to the terminal devices.

It should be noted that the server may be hardware or software. When the server is hardware, it may be implemented as a distributed server cluster composed of a plurality of servers, or as a single server. When the server is software, it may be implemented as, for example, a plurality of software or software modules for providing distributed services, or as a single software or software module. The present disclosure is not specifically limited herein.

In practice, the method for generating a 3D joint point regression model and the method for generating 3D joint point coordinates provided by the embodiments of the present disclosure may be performed by the terminal devices 101, 102, 103 and/or the server 105 or 106, and an apparatus for generating a 3D joint point regression model and an apparatus for generating 3D joint point coordinates may also be provided in the terminal devices 101, 102, 103 and/or the server 105 or 106.

It should be understood that the number of terminal devices, networks, and servers in FIG. 1 is merely illustrative. Depending on the implementation needs, there may be any number of terminal devices, networks, and servers.

Figure 2:
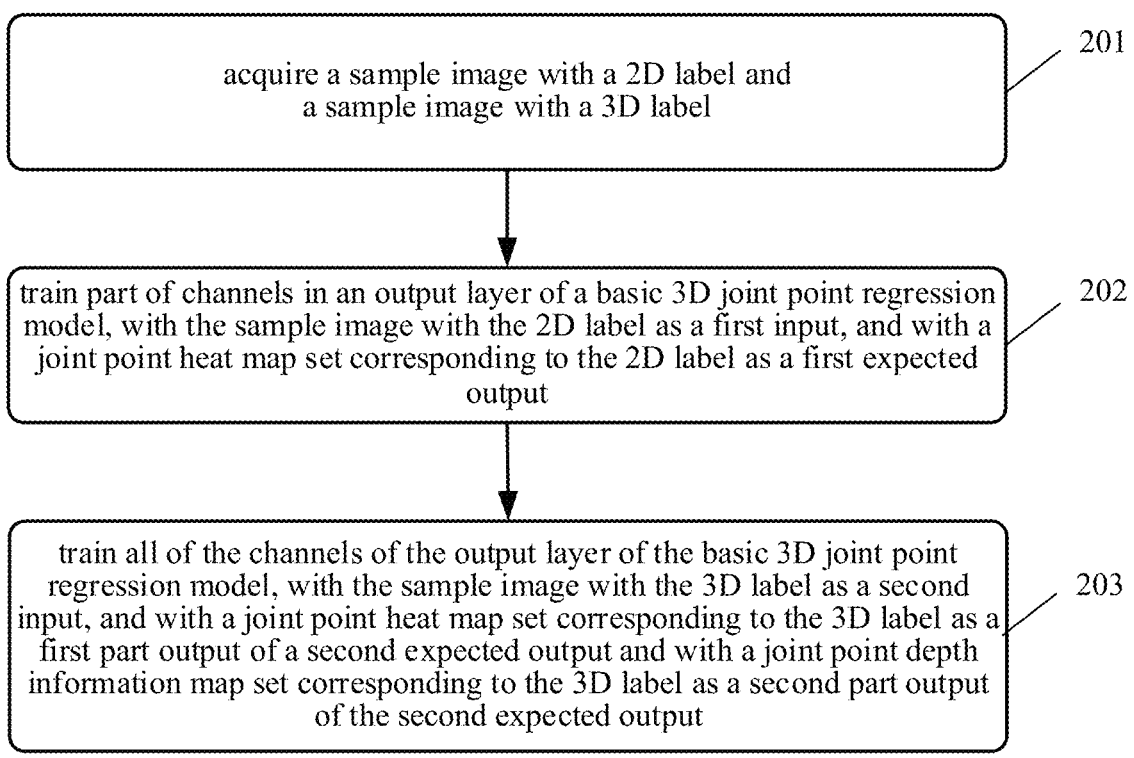
FIG. 2 is a schematic flowchart of a method for generating a 3D joint point regression model according to an embodiment of the present disclosure.

With further reference to FIG. 2, FIG. 2 illustrates a flow 200 of a method for generating a 3D joint point regression model according to an embodiment of the present disclosure. The method for generating a 3D joint point regression model includes the following steps:

Step 201, acquiring a sample image with a 2D label and a sample image with a 3D label.

In the present embodiment, an executing body of the method for generating a 3D joint point regression model (for example, the terminal or the server shown in FIG. 1) may acquire the sample image with the 2D label and the sample image with the 3D label locally or from the cloud.

Step 202, training part of channels in an output layer of a basic 3D joint point regression model, with the sample image with the 2D label as a first input, and with a joint point heat map set corresponding to the 2D label as a first expected output.

In the present embodiment, the sample image with the 2D label refers to a training sample image with a two-dimensional coordinate label that is used to train the basic 3D joint point regression model. The joint point heat map set is a heat map marked with key points indicating joints. Part of channels refer to part of the fully connected output channels in the output layer.

The basic 3D joint point regression model may include at least one of: an initial 3D joint point regression model; or a pre-trained 3D joint point regression model obtained by training an initial 3D joint point regression model using the sample image with the 2D label.

Here, the initial joint point regression model may be implemented using a cascaded hourglass model; may also be implemented using a convolutional pose machines (CPM) model which learns spatial information and texture information and estimates human body pose based on a serialized full convolutional network structure; in addition, it may also be implemented using a human body pose recognition project model (OpenPose), or a human body pose estimation model (AlphaPose), etc.

Here, after training the initial 3D joint point regression model using the sample image with the 2D label to obtain the pre-trained 3D joint point regression model, the pre-trained 3D joint point regression model is used as the basic 3D joint point regression model, which is equivalent to using a first few layers of the pre-trained 3D joint point regression model to extract shallow features, and finally falling into classification of a newly training. In this regard, it is not necessary to completely retrain the initial 3D joint point regression model, therefore, the efficiency of generating the 3D joint point regression model may be improved. The accuracy may slowly increase from a very low value for a newly trained initial 3D joint point regression model. Using the pre-trained 3D joint point regression model can obtain a good effect after a relatively small number of iterations.

When training the part of the channels in the output layer of the basic 3D joint point regression model, with the sample image with the 2D label as the first input, and with the joint point heat map set corresponding to the 2D label as the first expected output, the training effect may be constrained by adopting a loss function in the existing technology or technology developed in the future. For example, one or more of the mean square error loss function, the average absolute error loss function, the Huber loss function, the Log-Cosh loss function, and the quantile loss function may be used as the loss function.

In a specific example, the pre-trained 3D joint point regression model may be obtained by: training the initial 3D joint point regression model, with the sample image with the 2D label as an input, with the 2D label as an expected output, and with an Euclidean distance between a joint point coordinates determined based on the joint point heat map set output by the joint point regression model and 2D joint point coordinates in the 2D label as a loss function.

In some alternative implementations of the present embodiment, the training the part of the channels in the output layer of the basic 3D joint point regression model, with the sample image with the 2D label as the first input, and with the joint point heat map set corresponding to the 2D label as the first expected output, includes: training the part of the channels in the output layer of the basic 3D joint point regression model, with the sample image with the 2D label as the first input, with the joint point heat map set corresponding to the 2D label as the first expected output, and with a geometric constraint loss function corresponding to the sample image with the 2D label as a loss function corresponding to the first expected output.

In this implementation, the geometric constraint loss function refers to a loss function determined based on geometric constraints of the bones of a body (for example, the lengths of the bones, the connection relationship between the bones, etc.).

For the sample image with the 2D label without depth information label, the geometric constraint loss function is used as the loss function, which may reduce the influence of unlabeled depth information on the accuracy of a final training result and improve the accuracy of the some channels in the output layer of the trained 3D joint point regression model.

In some alternative implementations of the present embodiment, the geometric constraint loss function includes: an Euclidean distance between a length ratio of a predicted bone and an average value of length ratios of bones in a sample image set; wherein the predicted bone is a bone in the joint point heat map set output by the basic 3D joint point regression model; the length ratio of a predicted bone is: a ratio of a length of a predicted bone corresponding to a sample image in the sample image set selected in a single training to a length of a bone in a reference data set; and the length ratios of the bones in the sample image set are: ratios of lengths of all predicted bones corresponding to all sample images in the sample image set selected in the single training to the length of the bone in the reference data set.

In this implementation, for the sample image with the 2D label (including a sample image with 2D label included in the sample images with the 3D label), the geometric constraint loss function is specifically as formula (1):

$$L_{dep}(\hat{Y}_{dep} \mid I, Y_{2D}) = \begin{cases} \lambda_{reg} \|Y_{dep} - \hat{Y}_{dep}\|^2, & \text{if } I \in \mathcal{I}_{3D} \\ \lambda_g L_g(\hat{Y}_{dep} \mid Y_{2D}), & \text{if } I \in \mathcal{I}_{2D} \end{cases} \quad \text{formula (1)}$$

Here, $L_{dep}(\hat{Y} \mid I, Y_{2D})$ refers to an overall loss function used to train the basic 3D joint point regression model, different loss functions for distance calculation are used for 2D coordinate data and 3D coordinate data; $\lambda_{reg}$ and $\lambda_g$ represent the weights of 2D Loss and 3D Loss set for the currently loaded sample image, which may be set by those skilled in the art based on experience, application scenarios, or the ratio of the sample images with 2D labels and the sample images with 3D labels in a loaded sample image set. $\hat{Y}_{dep}$ represents 3D coordinate data predicted by the current 3D joint point regression model, $Y_{dep}$ represents the ground truth of the 3D coordinate data; $I \in \mathcal{I}_{3D}$ represents that the currently loaded sample image is a sample image with a 3D label containing 3D coordinates, and $I \in \mathcal{I}_{2D}$ represents that the currently loaded sample image is a sample image with a 2D label or a 3D label containing 2D coordinates.

$L_g(\hat{Y}_{dep} \mid Y_{2D})$ refers to the geometric constraint loss function. It is mainly based on the fact that the bone length ration of a certain body is relatively fixed. For example, the length ratio of the upper arm to the lower arm, and the length ratio of the thigh to the calf of a body are approximately fixed, and the length of the left arm and the right arm should also be the same. Here, $R_i$ may be used to represent a set of bones to be calculated (that is, the currently loaded sample image set), $l_b$ may be used to represent the length of bone b, and the average length of bones in the reference data set Human 3.6M may be used as the bone reference $\overline{l_b}$ in the loss function. Therefore, the ratio $$\frac{l_b}{\overline{l_b}}$$

should be a fixed number for each set $R_i$ of bones (that is, each predicted bone in the sample image set) that needs to be calculated. The final $L_g(\hat{Y}_{dep}|Y_{2D})$ formula is defined as the following formula (2):

$$L_g(\hat{Y}_{dep}|Y_{2D}) = \sum_i \frac{1}{|R_i|} \sum_{b \in R_i} \left(\frac{l_b}{\overline{l_b}} - \overline{r}_i\right)^2 \quad \text{formula (2)}$$

where, $$\overline{r}_i = \frac{1}{|R_i|} \sum_{b \in R_i} \frac{l_b}{\overline{l_b}}$$

$|R_i|$ represents the size of the sample image set, $\overline{r}_i$ is calculated using the above formula, and its meaning represents that the ratio of the length of each predicted bone in the currently learned sample image set to the length of the bones in the reference data set.

Step 203, training all of the channels of the output layer of the basic 3D joint point regression model, with the sample image with the 3D label as a second input, and with a joint point heat map set corresponding to the 3D label as a first part output of a second expected output and with a joint point depth information map set corresponding to the 3D label as a second part output of the second expected output.

In the present embodiment, the sample image with 3D label refers to a training sample image with three-dimensional coordinate label that is used to train the basic 3D joint point regression model. The joint point depth information map is an image indicating depth information of joint points. All of the channels refer to all fully connected output channels in the output layer.

During training all of the channels in the output layer of the basic 3D joint point regression model, with the sample image with the 3D label as a second input, and with a joint point heat map set corresponding to the 3D label as a first part output of a second expected output and with a joint point depth information map set corresponding to the 3D label as a second part output of the second expected output, the training effect may be constrained by adopting a loss function in the existing technology or technology developed in the future. For example, one or more of the mean square error loss function, the average absolute error loss function, the Huber loss function, the Log-Cosh loss function, and the quantile loss function may be used as the loss function.

In some alternative implementations of the present embodiment, the training all of the channels in the output layer of the basic 3D joint point regression model, with the sample image with the 3D label as the second input, and with the joint point heat map set corresponding to the 3D label as the first part output of the second expected output and with the joint point depth information map set corresponding to the 3D label as the second part output of the second expected output, includes: training all of the channels in the output layer of the basic 3D joint point regression model, with the sample image with the 3D label as the second input, with the joint point heat map set corresponding to the 3D label as the first part output of the second expected output and with the joint point depth information map set corresponding to the 3D label as the second part output of the second expected output, with a weighted value of a geometric constraint loss function corresponding to the sample image with the 3D label as a loss function corresponding to the first part output of the second expected output, and with a weighted value of an Euclidean distance loss function corresponding to the sample image with 3D label as a loss function corresponding to the second part output of the second expected output.

In this implementation, by training all of the channels in the output layer of the basic 3D joint point regression model, with the sample image with the 3D label as the second input, with the joint point heat map set corresponding to the 3D label as the first part output of the second expected output and with the joint point depth information map set corresponding to the 3D label as the second part output of the second expected output, with a weighted value of a geometric constraint loss function corresponding to the sample image with the 3D label as a loss function corresponding to the first part output of the second expected output, and with a weighted value of a Euclidean distance loss function corresponding to the sample image with the 3D label as a loss function corresponding to the second part output of the second expected output, so that on the basis of adopting the data with the 2D label to train part of the channels of the output layer of the basic 3D joint point regression model, the sample image with 3D label may be adopted to further train all of the channels in the output layer of the basic 3D joint point regression model. After a relatively small number of iterations, the accuracy of the output of all the channels in the output layer of the trained basic 3D joint point regression model may be improved.

In some alternative implementations of the present embodiment, the Euclidean distance loss function corresponding to the sample image with 3D label includes: a Euclidean distance between depth information in the joint point depth information map set output by the basic 3D joint point regression model and joint point depth information labeled in the 3D label, when the sample image with the 3D label is used as the second input.

In this implementation, for a sample image that is labeled with 3D coordinate information completely, the Euclidean distance corresponding to the sample image with the 3D label may be first calculated as the Euclidean distance loss function, and then the weighted value of the Euclidean distance loss function may be used as the loss function corresponding to the second part output of the second expected output, thereby improving the efficiency of calculating the loss function, and further improving the efficiency of generating the 3D joint point regression model.

The method for generating a 3D joint point regression model of the above embodiments of the present disclosure, the sample image with the 2D label and the sample image with the 3D label may be used to respectively train part of the channels and all of the channels of the joint point regression model. Parameters of the joint point regression model may be adjusted at the same time by using the sample image with 2D label and the sample image with 3D label, so that a joint point regression model having high prediction ability may be trained in the situation of that sample images with 3D label are limited, thereby improving the accuracy for subsequent generating a 3D joint point of an input image by the trained joint point regression model.

Figure 3A:
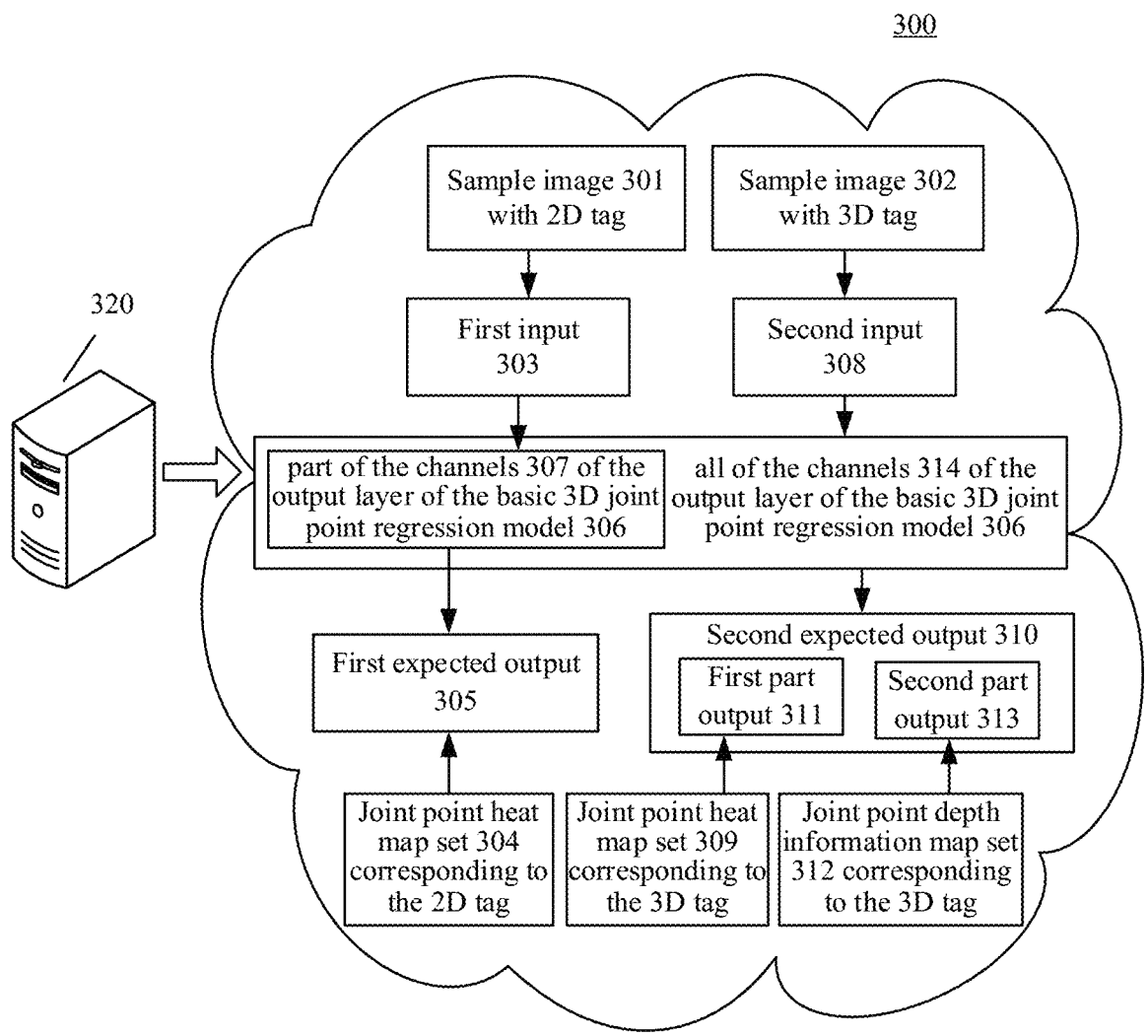
FIG. 3A is an exemplary application scenario of the method for generating a 3D joint point regression model according to an embodiment of the present disclosure.
Figure 3B:
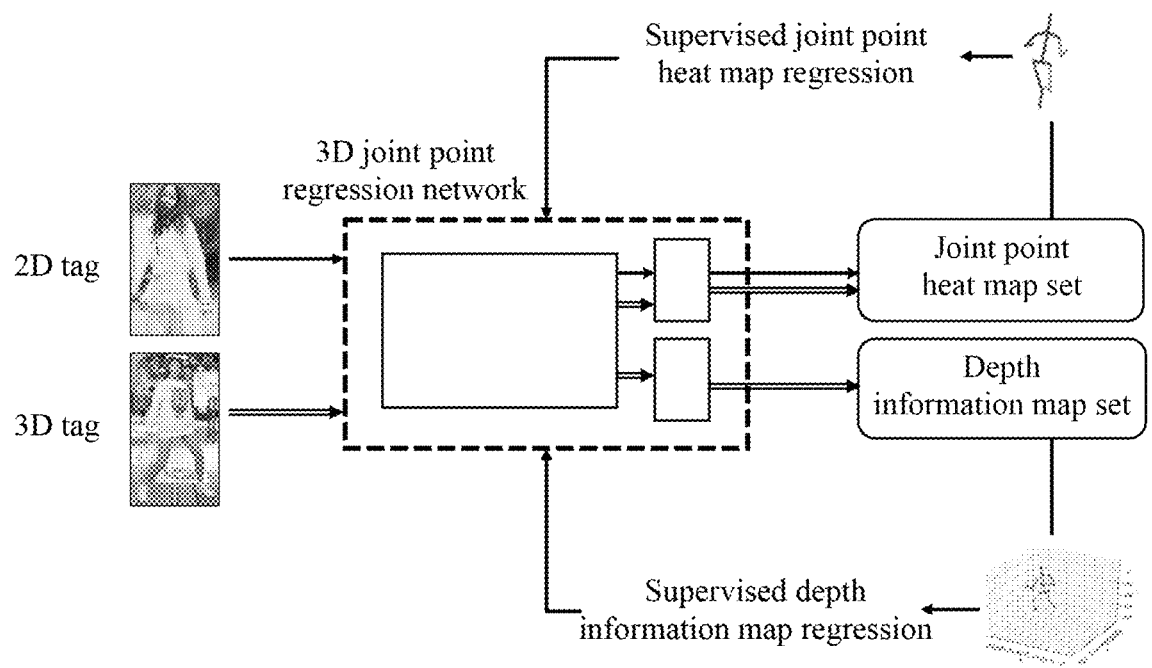
FIG. 3B is a schematic diagram of the method for generating a 3D joint point regression model for implementing the application scenario in FIG. 3A.

The following describes an exemplary application scenario of the method for generating a 3D joint point regression model of the present disclosure with reference to FIGS. 3A and 3B.

As shown in FIG. 3A, FIG. 3A shows an exemplary application scenario of the method for generating a 3D joint point regression model according to an embodiment of the present disclosure.

As shown in FIG. 3A, the method 300 for generating a 3D joint point regression model runs in an electronic device 320, and the method 300 includes:

First, acquiring a sample image 301 with a 2D label and a sample image 302 with a 3D label;

then, using the sample image 301 with 2D label as a first input 303, and using a joint point heat map set 304 corresponding to the 2D label as a first expected output 305, training part of the channels 307 of an output layer of a basic 3D joint point regression model 306; and finally, training all of the channels 314 in the output layer of the basic 3D joint point regression model, with the sample image 302 with the 3D label as a second input 308, and with a joint point heat map set 309 corresponding to the 3D label as a first part output 311 of a second expected output 310 and with a joint point depth information map set 312 corresponding to the 3D label as a second part output 313 of the second expected output 310.

It should be understood that the application scenario of the method for generating a 3D joint point regression model shown in FIG. 3A is only an exemplary description of the method for generating a 3D joint point regression model, and does not represent a limitation on the method. For example, each step shown in FIG. 3A may be further implemented using a more detailed method. It is also possible to further add other steps on the basis of the above FIG. 3A.

As shown in FIG. 3B, in FIG. 3B, when the 3D joint point regression model loads an image sample with a 2D label, a 3D joint point regression network outputs a joint point heat map set corresponding to the 2D label, and uses the 2D label to form a supervised joint point heat map regression to train a 3D joint point regression network model; when the 3D joint point regression model loads an image sample with a 3D label, the 3D joint point regression network outputs a joint point heat map set and a depth information map set corresponding to the 3D label, and uses the 3D label to form a supervised joint point heat map regression and a supervised depth information map regression to train the 3D joint point regression network model. After training is performed by alternatively using the image sample with the 2D label and the image sample with the 3D label, a trained 3D joint point regression network model may be obtained.

Figure 4:
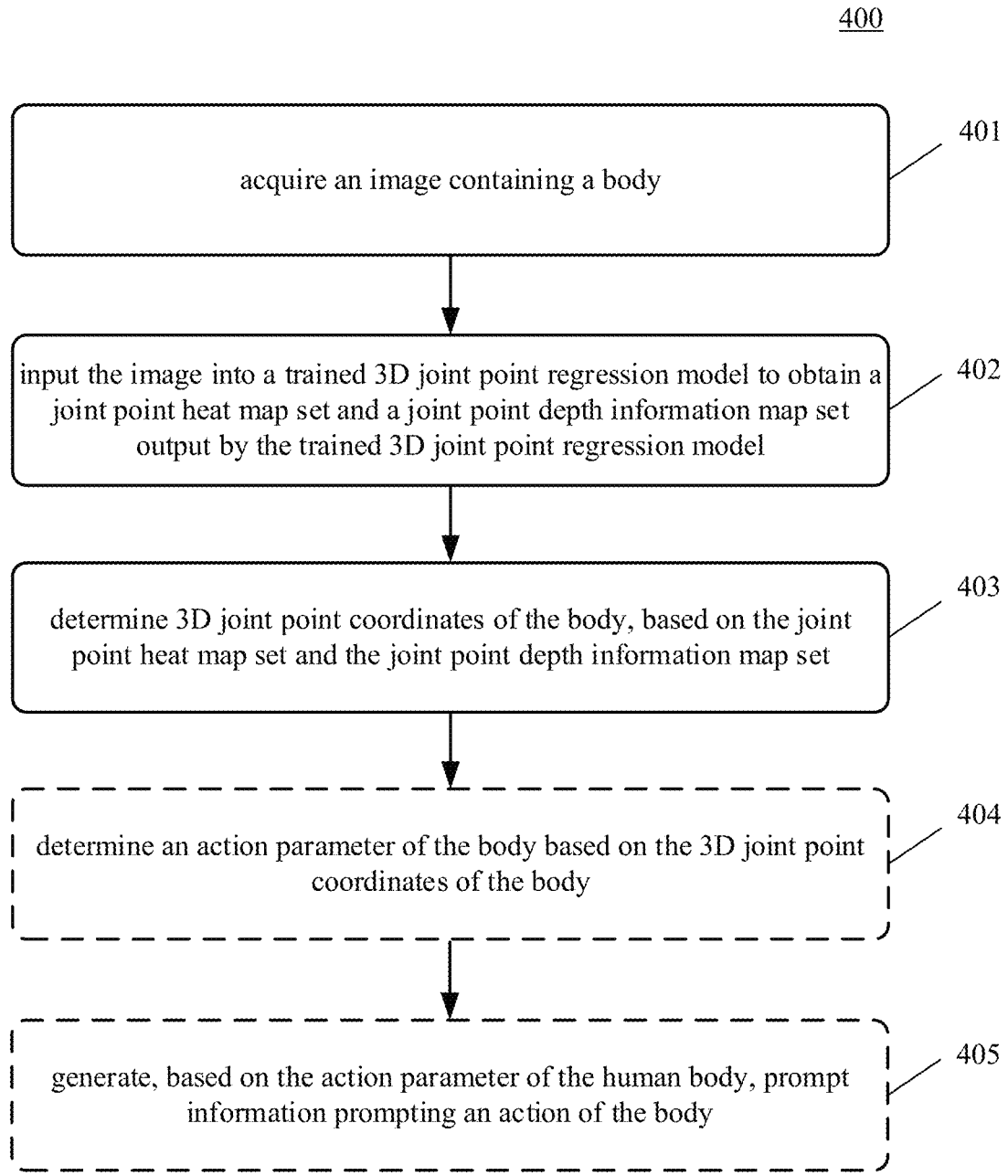
FIG. 4 is a schematic flowchart of an embodiment of a method for generating 3D joint point coordinates according to an embodiment of the present disclosure.

With further reference to FIG. 4, FIG. 4 illustrates a schematic flowchart of a method for generating 3D joint point coordinates according to an embodiment of the present disclosure.

As shown in FIG. 4, a method 400 for generating 3D joint point coordinates in the present embodiment may include the following steps:

In step 401, acquiring an image containing a body.

In the present embodiment, an executing body of the method for generating 3D joint point coordinates (for example, the terminal or the server shown in FIG. 1) may acquire the image containing a body locally or from the cloud.

In step 402, inputting the image into a trained 3D joint point regression model to obtain a joint point heat map set and a joint point depth information map set output by the trained 3D joint point regression model.

In the present embodiment, the executing body may input the image into the trained 3D joint point regression model to obtain the joint point heat map set output by the part of channels of the output layer of the trained 3D joint point regression model, and the joint point depth information map set output by the channels except the above part of channels in all of the channels of the output layer of the trained 3D joint point regression model.

Here, the trained 3D joint point regression model is obtained by training a basic 3D joint point regression model using the method for generating a 3D joint point regression model as described in FIG. 2 or FIG. 3 above.

In step 403, determining 3D joint point coordinates of the body, based on the joint point heat map set and the joint point depth information map set.

In the present embodiment, the executing body of the method for generating 3D joint point coordinates (for example, the terminal or the server shown in FIG. 1) may determine 2D coordinates of each joint point based on the joint point heat map set; and then obtain depth coordinate of each joint point, based on the joint point depth information map set. Thus, for each joint point, the 2D coordinates and the depth coordinate are combined to obtain the 3D joint point coordinates.

In an alternative step 404, determining an action parameter of the body based on the 3D joint point coordinates of the body.

In the present embodiment, the executing body may determine the action parameter of the body based on the 3D joint point coordinates of the body in the image. These action parameters may indicate the actions that the body executes.

In step 405, generating, based on the action parameter of the human body, prompt information prompting an action of the body.

In the present embodiment, the executing body may determine whether these action parameters meet a reminder condition based on the action parameter of the body, if yes, generate the prompt information corresponding to the reminder condition and prompting the action of the body. Further, the prompt information may also be presented to the user to guide the user's next action.

Exemplarily, during fitness guidance, the executing body may generate, based on whether the action parameter of the body meet a fitness reminder condition, prompt information corresponding to the fitness reminder condition and prompting the action of the body when the fitness reminder condition is met, and present the prompt information to the user to guide the user's next fitness action.

In another example, in a 3D human-computer interaction service, the executing body may generate, based on whether the action parameter of the human body meet a human-computer interaction reminder condition, prompt information corresponding to the human-computer interaction reminder condition and prompting the action of the body when the human-computer interaction reminder condition is met, and present the prompt information to the user to guide the user's next human-computer interaction action.

The method for generating 3D joint point coordinates in the embodiment in FIG. 4 of the present disclosure, on the basis of the method for generating a 3D joint point regression model shown in FIG. 2, further inputs an image containing a body into the trained 3D joint point regression model to obtain the joint point heat map set and the joint point depth information map set output by the trained 3D joint point regression model, and determines the 3D joint point coordinates of the body based on the joint point heat map set and the joint point depth information map set, improving the accuracy and efficiency of the 3D joint point coordinates of the determined body.

In some embodiments, the action parameter of the human body may also be determined based on the 3D joint point coordinates of the body, and then based on the action parameter of the body, prompt information prompting the action of the body is generated, thereby improving the accuracy and pertinence of the action of the body.

Figure 5:
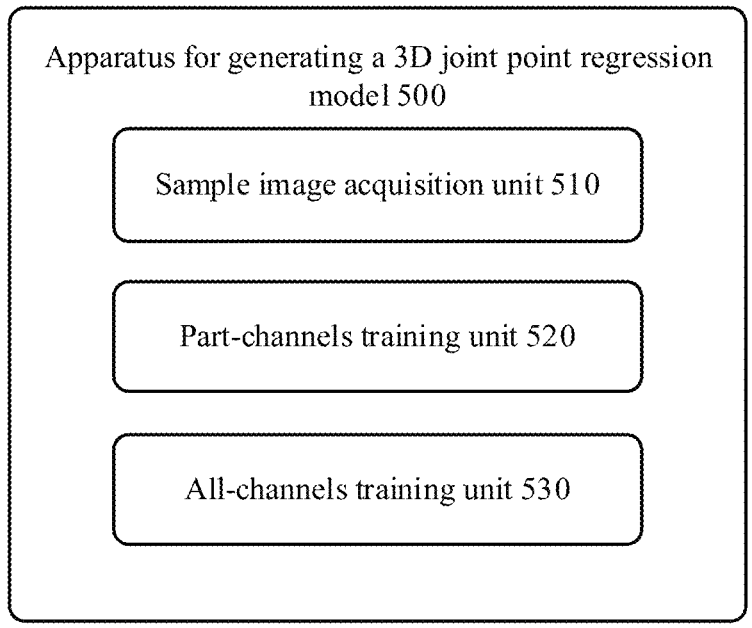
FIG. 5 is an exemplary structural diagram of an embodiment of an apparatus for generating a 3D joint point regression model of the present disclosure.

With further reference to FIG. 5, as an implementation of the method shown in the above figures, some embodiments of the present disclosure provide an apparatus for generating a 3D joint point regression model, and the apparatus embodiments correspond to the method embodiments as shown in FIGS. 2 to 4, and the apparatus may be specifically applied to the above terminal device or server.

As shown in FIG. 5, an apparatus 500 for generating a 3D joint point regression model of the present embodiment may include: a sample image acquisition unit 510, configured to acquire a sample image with a 2D label and a sample image with a 3D label; a part-channels training unit 520, configured to train part of channels of an output layer of a basic 3D joint point regression model, with the sample image with the 2D label as a first input, and with a joint point heat map set corresponding to the 2D label as a first expected output; and an all-channels training unit 530, configured to train all of the channels of the output layer of the basic 3D joint point regression model, with the sample image with the 3D label as a second input, and with a joint point heat map set corresponding to the 3D label as a first part output of a second expected output and with a joint point depth information map set corresponding to the 3D label as a second part output of the second expected output.

In some embodiments, the part-channels training unit 520 is further configured to: train the part of the channels of the output layer of the basic 3D joint point regression model, with the sample image with the 2D label as the first input, with the joint point heat map set corresponding to the 2D label as the first expected output, and with a geometric constraint loss function corresponding to the sample image with the 2D label as a loss function corresponding to the first expected output.

In some embodiments, the all-channels training unit 530 is further configured to: train all of the channels of the output layer of the basic 3D joint point regression model, with the sample image with the 3D label as the second input, with the joint point heat map set corresponding to the 3D label as the first part output of the second expected output and with the joint point depth information map set corresponding to the 3D label as the second part output of the second expected output, with a weighted value of a geometric constraint loss function corresponding to the sample image with the 3D label as a loss function corresponding to the first part output of the second expected output, and with a weighted value of a Euclidean distance loss function corresponding to the sample image with the 3D label as a loss function corresponding to the second part output of the second expected output.

In some embodiments, the geometric constraint loss function in the part-channels training unit or the all-channels training unit includes: an Euclidean distance between a length ratio of a predicted bone and an average value of length ratios of bones in a sample image set; where the predicted bone is a bone in the joint point heat map set output by the basic 3D joint point regression model; the length ratio of a predicted bone is: a ratio of a length of a predicted bone corresponding to a sample image in the sample image set selected in a single training to a length of a bone in a reference data set; and the length ratios of the bones in the sample image set are: ratios of lengths of all predicted bones corresponding to all sample images in the sample image set selected in a single training to the length of the bone in the reference data set.

In some embodiments, the Euclidean distance loss function corresponding to the sample image with the 3D label in the all-channels training unit includes: an Euclidean distance between depth information in the joint point depth information map set output by the basic 3D joint point regression model and joint point depth information labeled in the 3D label, when the sample image with the 3D label is used as the second input.

In some embodiments, the basic 3D joint point regression model in the part-channels training unit or the all-channels training unit includes any one of: an initial 3D joint point regression model; or a pre-trained 3D joint point regression model obtained by training an initial 3D joint point regression model using the sample image with the 2D label.

In some embodiments, the pre-trained 3D joint point regression model is obtained by: training the initial 3D joint point regression model, with the sample image with the 2D label as an input, with the 2D label as an expected output, and with an Euclidean distance between a joint point coordinates determined based on the joint point heat map set output by the joint point regression model and 2D joint point coordinates in the 2D label as a loss function.

It should be understood that the units recorded in the apparatus 500 correspond to the steps recorded in the method described with reference to FIGS. 2 to 3. Therefore, the operations and features described above for the method are also applicable to the apparatus 500 and the units contained therein, and detailed description thereof will be omitted.

Figure 6:
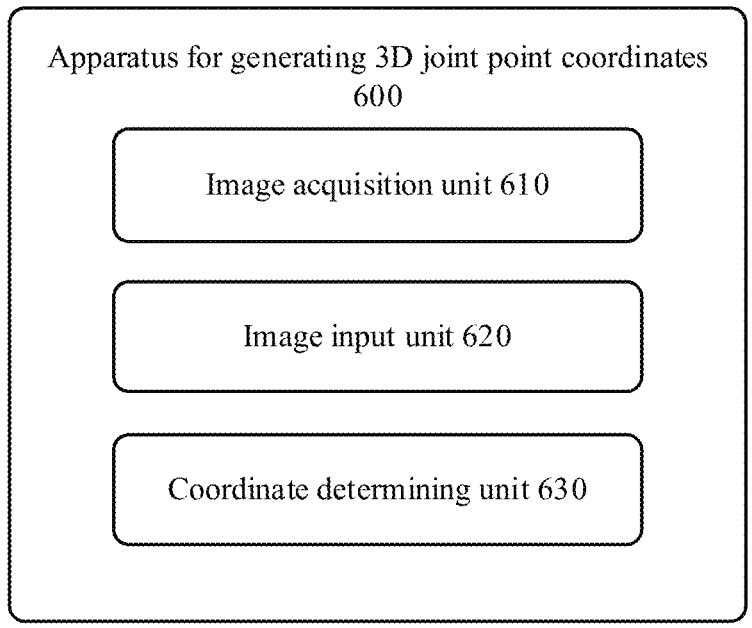
FIG. 6 is an exemplary structural diagram of an embodiment of an apparatus for generating 3D joint point coordinates of the present disclosure.

With further reference to FIG. 6, as an implementation of the method shown in the above figures, the embodiment of the present disclosure provides an embodiment of an apparatus for generating 3D joint point coordinates, and the apparatus embodiment corresponds to the method embodiment as shown in FIG. 4, and the apparatus may be specifically applied to the above terminal device or server.

As shown in FIG. 6, an apparatus 600 for generating 3D joint point coordinates of the present embodiment may include: an image acquisition unit 610, configured to acquire an image containing a body; an image input unit 620, configured to input the image into a trained 3D joint point regression model to obtain a joint point heat map set and a joint point depth information map set output by the trained 3D joint point regression model, where the trained 3D joint point regression model is obtained by training a basic 3D joint point regression model using the apparatus for generating a 3D joint point regression model of any one of the above embodiments; and a coordinate determining unit 630, configured to determine 3D joint point coordinates of the body, based on the joint point heat map set and the joint point depth information map set.

In some embodiments, the apparatus further includes: an action parameter determining unit, configured to determine an action parameter of the body based on the 3D joint point coordinates of the body; and a prompt information generation unit, configured to generate, based on the action parameter of the body, prompt information prompting an action of the figure, based on the action parameter of the body.

It should be understood that the units recorded in the apparatus 600 correspond to the steps recorded in the method described with reference to FIG. 4. Therefore, the operations and features described above for the method are also applicable to the apparatus 600 and the units contained therein, and detailed description thereof will be omitted.

Figure 7:
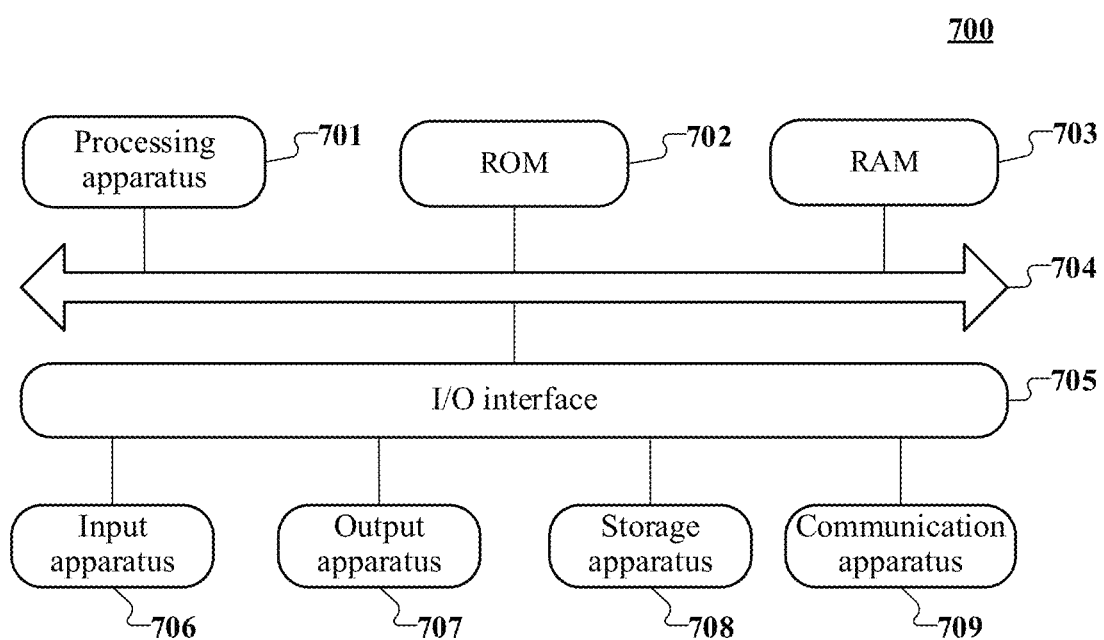
FIG. 7 is a schematic structural diagram of a computer system of a server suitable for implementing the embodiments of the present disclosure.

With further reference to FIG. 7, a schematic structural diagram of an electronic device (for example, the server or terminal device shown in FIG. 1) 700 adapted to implement the embodiments of the present disclosure is illustrated. The terminal devices in the embodiments of the present disclosure may include, but are not limited to, notebook computers, desktop computers, and the like. The terminal device/server shown in FIG. 7 is only an example, and should not bring any limitation to the functions and use scope of the embodiments of the present disclosure.

As shown in FIG. 7, the electronic device 700 may include a processing apparatus (for example, a central processor, a graphics processor, etc.) 701, which may execute various appropriate actions and processes in accordance with a program stored in a read-only memory (ROM) 702 or a program loaded into a random access memory (RAM) 703 from a storage apparatus 708. The RAM 703 also stores various programs and data required by operations of the electronic device 700. The processing apparatus 701, the ROM 702 and the RAM 703 are connected to each other through a bus 704. An input/output (I/O) interface 705 is also connected to the bus 704.

Generally, the following apparatuses may be connected to the I/O interface 705: an input apparatus 706, including such as a touch screen, a touch pad, a keyboard, a mouse, a camera, a microphone, an accelerometer, or a gyroscope; an output apparatus 707 including such as a liquid crystal display (LCD), a speaker, or a vibrator; the storage apparatus 708 including such as a magnetic tape, or a hard disk; and a communication apparatus 709. The communication apparatus 709 may allow the electronic device 700 to perform wireless or wired communication with other devices to exchange data. Although FIG. 7 shows the electronic device 700 having various apparatuses, it should be understood that it is not required to implement or have all the apparatuses shown. More or fewer apparatuses may be implemented or provided instead. Each block shown in FIG. 7 may represent one apparatus, and may also represent a plurality of apparatuses as required.

In particular, according to the embodiments of the present disclosure, the process described above with reference to the flow chart may be implemented in a computer software program. For example, an embodiment of the present disclosure includes a computer program product, which includes a computer program that is tangibly embedded in a computer readable medium. The computer program includes program codes for performing the method as illustrated in the flow chart. In such an embodiment, the computer program may be downloaded and installed from a network via the communication apparatus 709, or installed from the storage apparatus 708, or installed from the ROM 702. The computer program, when executed by the processing apparatus 701, implements the above mentioned functionalities as defined by the method of the embodiments of the present disclosure.

It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In some embodiments of the present disclosure, the computer readable storage medium may be any tangible medium containing or storing programs which can be used by a command execution system, apparatus or element or incorporated thereto. In some embodiments of the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The computer readable medium may be included in the above electronic device, or a stand-alone computer readable medium not assembled into the electronic device. The computer readable medium carries one or more programs. The one or more programs, when executed by the electronic device, cause the electronic device to: acquire a sample image with a 2D label and a sample image with a 3D label; use the sample image with the 2D label as a first input, and use a joint point heat map set corresponding to the 2D label as a first expected output, train some channels in an output layer of a basic 3D joint point regression model; and use the sample image with the 3D label as a second input, use a joint point heat map set corresponding to the 3D label as a first part output of a second expected output, and use a joint point depth information map set corresponding to the 3D label as a second part output of the second expected output, train all channels in the output layer of the basic 3D joint point regression model. Or, acquire an image containing a figure; input the image into a trained 3D joint point regression model to obtain a joint point heat map set and a joint point depth information map set output by the trained 3D joint point regression model; and determine 3D joint point coordinates of the figure, based on the joint point heat map set and the joint point depth information map set.

A computer program code for executing operations in some embodiments of the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units involved in embodiments of the present disclosure may be implemented by means of software or hardware. The described units may also be provided in a processor, for example, may be described as: a processor including a sample image acquisition unit, a part-channels training unit, and an all-channels training unit. Here, the names of these units do not in some cases constitute limitations to such units themselves. For example, the sample image acquisition unit may also be described as "a unit configured to acquire a sample image with a 2D label and a sample image with a 3D label".

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for generating a three-dimensional (3D) joint point regression model, the method comprising:
    acquiring a sample image with a two-dimensional (2D) label and a sample image with a 3D label;
    training part of channels of an output layer of a basic 3D joint point regression model, with the sample image with the 2D label as a first input, and with a joint point heat map set corresponding to the 2D label as a first expected output; and
    training all of the channels of the output layer of the basic 3D joint point regression model, with the sample image with the 3D label as a second input, and with a joint point heat map set corresponding to the 3D label as a first part output of a second expected output and with a joint point depth information map set corresponding to the 3D label as a second part output of the second expected output, wherein the training all of the channels of the output layer of the basic 3D joint point regression model, with the sample image with the 3D label as the second input, and with the joint point heat map set corresponding to the 3D label as the first part output of the second expected output and with the joint point depth information map set corresponding to the 3D label as the second part output of the second expected output, comprises:
    training all of the channels of the output layer of the basic 3D joint point regression model, with the sample image with the 3D label as the second input, with the joint point heat map set corresponding to the 3D label as the first part output of the second expected output and with the joint point depth information map set corresponding to the 3D label as the second part output of the second expected output, with a weighted value of a first loss function corresponding to the sample image with the 3D label as a loss function corresponding to the first part output of the second expected output, and with a weighted value of a second loss function corresponding to the sample image with the 3D label as a loss function corresponding to the second part output of the second expected output, the first loss function being different from the second loss function.

2. The method according to claim 1, wherein the training the part of the channels of the output layer of the basic 3D joint point regression model, with the sample image with the 2D label as the first input, and with the joint point heat map set corresponding to the 2D label as the first expected output, comprises:
    training the part of the channels of the output layer of the basic 3D joint point regression model, with the sample image with the 2D label as the first input, with the joint point heat map set corresponding to the 2D label as the first expected output, and with a geometric constraint loss function corresponding to the sample image with the 2D label as a loss function corresponding to the first expected output.

3. The method according to claim 1, wherein the first loss function is a geometric constraint loss function, and the second loss function is an Euclidean distance loss function.

4. The method according to claim 2, wherein the geometric constraint loss function comprises: an Euclidean distance between a length ratio of a predicted bone and an average value of length ratios of bones in a sample image set;
    wherein the predicted bone is a bone in a joint point heat map set output by the basic 3D joint point regression model;
    the length ratio of a predicted bone is: a ratio of a length of a predicted bone corresponding to a sample image in the sample image set selected in a single training to a length of a bone in a reference data set; and
    the length ratios of the bones in the sample image set are: ratios of lengths of all predicted bones corresponding to all sample images in the sample image set selected in the single training to the length of the bone in the reference data set.

5. The method according to claim 3, wherein the Euclidean distance loss function corresponding to the sample image with the 3D label comprises:
    an Euclidean distance between depth information in the joint point depth information map set output by the basic 3D joint point regression model and joint point depth information labeled in the 3D label, when the sample image with the 3D label is used as the second input.

6. The method according to claim 1, wherein the basic 3D joint point regression model comprises any one of:
an initial 3D joint point regression model; or
a pre-trained 3D joint point regression model obtained by training an initial 3D joint point regression model using the sample image with the 2D label.

7. The method according to claim 6, wherein the pre-trained 3D joint point regression model is obtained by:
training the initial 3D joint point regression model, with the sample image with the2D label as an input, with the 2D label as an expected output, and with an Euclidean distance between a joint point coordinate determined based on the joint point heat map set output by the joint point regression model and a 2D joint point coordinate in the 2D label as a loss function.

8. A method using the trained three-dimensional (3D) joint point regression model trained according to claim 1 for generating 3D joint point coordinates, comprising:
acquiring an image containing a body;
inputting the image into the trained 3D joint point regression model to obtain a joint point heat map set and a joint point depth information map set output by the trained 3D joint point regression model; and
determining 3D joint point coordinates of the body, based on the joint point heat map set and the joint point depth information map set.

9. The method according to claim 8, wherein the method further comprises:
determining an action parameter of the body based on the 3D joint point coordinates of the body; and
generating, based on the action parameter of the body, prompt information prompting an action of the body.

10. An electronic device, comprising:
at least one processor; and
a storage apparatus, for storing one or more programs, the one or more programs, when executed by the one or more processors, cause the one or more processors to implement operations, the operations comprising:
acquiring a sample image with a two-dimensional (2D) label and a sample image with a three-dimensional (3D) label;
training part of channels of an output layer of a basic 3D joint point regression model, with the sample image with the 2D label as a first input, and with a joint point heat map set corresponding to the 2D label as a first expected output; and
training all of the channels of the output layer of the basic 3D joint point regression model, with the sample image with the 3D label as a second input, and with a joint point heat map set corresponding to the 3D label as a first part output of a second expected output and with a joint point depth information map set corresponding to the 3D label as a second part output of the second expected output, wherein the training all of the channels of the output layer of the basic 3D joint point regression model, with the sample image with the 3D label as the second input, and with the joint point heat map set corresponding to the 3D label as the first part output of the second expected output and with the joint point depth information map set corresponding to the 3D label as the second part output of the second expected output, comprises:
training all of the channels of the output layer of the basic 3D joint point regression model, with the sample image with the 3D label as the second input, with the joint point heat map set corresponding to the 3D label as the first part output of the second expected output and with the joint point depth information map set corresponding to the 3D label as the second part output of the second expected output, with a weighted value of a first loss function corresponding to the sample image with the 3D label as a loss function corresponding to the first part output of the second expected output, and with a weighted value of a second loss function corresponding to the sample image with the 3D label as a loss function corresponding to the second part output of the second expected output, the first loss function being different from the second loss function.

11. The electronic device according to claim 10, wherein the training the part of the channels of the output layer of the basic 3D joint point regression model, with the sample image with the 2D label as the first input, and with the joint point heat map set corresponding to the 2D label as the first expected output, comprises:
training the part of the channels of the output layer of the basic 3D joint point regression model, with the sample image with the 2D label as the first input, with the joint point heat map set corresponding to the 2D label as the first expected output, and with a geometric constraint loss function corresponding to the sample image with the 2D label as a loss function corresponding to the first expected output.

12. The electronic device according to claim 10, wherein the first loss function is a geometric constraint loss function, and the second loss function is an Euclidean distance loss function.

13. The electronic device according to claim 11, wherein the geometric constraint loss function comprises: an Euclidean distance between a length ratio of a predicted bone and an average value of length ratios of bones in a sample image set;
wherein the predicted bone is a bone in the ajoint point heat map set output by the basic 3D joint point regression model;
the length ratio of a predicted bone is: a ratio of a length of a predicted bone corresponding to a sample image in the sample image set selected in a single training to a length of a bone in a reference data set; and
the length ratios of the bones in the sample image set are: ratios of lengths of all predicted bones corresponding to all sample images in the sample image set selected in the single training to the length of the bone in the reference data set.

14. The electronic device according to claim 10, wherein the Euclidean distance loss function corresponding to the sample image with the 3D label comprises:
an Euclidean distance between depth information in the joint point depth information map set output by the basic 3D joint point regression model and joint point depth information labeled in the 3D label, when the sample image with the 3D label is used as the second input.

15. The electronic device according to claim 10, wherein the basic 3D joint point regression model comprises any one of:
an initial 3D joint point regression model; or
a pre-trained 3D joint point regression model obtained by training an initial 3D joint point regression model using the sample image with the 2D label.

16. The electronic device according to claim 15, wherein the pre-trained 3D joint point regression model is obtained by:
  training the initial 3D joint point regression model, with the sample image with the 2D label as an input, with the 2D label as an expected output, and with an Euclidean distance between a joint point coordinate determined based on the joint point heat map set output by the joint point regression model and a 2D joint point coordinate in the 2D label as a loss function.

17. An electronic device using the trained three-dimensional (3D) joint point regression model trained according to claim 10 for generating 3D joint point coordinates, comprising:
  at least one processor; and
  a storage apparatus, for storing one or more programs, the one or more programs, when executed by the one or more processors, cause the one or more processors to implement operations, the operations comprising:
    acquiring an image containing a body;
    inputting the image into the trained 3D joint point regression model to obtain a joint point heat map set and a joint point depth information map set output by the trained 3D joint point regression model; and
    determining 3D joint point coordinates of the body, based on the joint point heat map set and the joint point depth information map set.

18. The electronic device according to claim 17, wherein the operations further comprise:
  determining an action parameter of the body based on the 3D joint point coordinates of the body; and
  generating, based on the action parameter of the body, prompt information prompting an action of the body.

19. A non-transitory computer readable medium, storing a computer program thereon, the program, when executed by a processor, cause the processor to implement operations, the operations comprising:
  acquiring a sample image with a two-dimensional (2D) label and a sample image with a 3D label;
  training part of channels of an output layer of a basic 3D joint point regression model, with the sample image with the 2D label as a first input, and with a joint point heat map set corresponding to the 2D label as a first expected output; and
  training all of the channels of the output layer of the basic 3D joint point regression model, with the sample image with the 3D label as a second input, and with a joint point heat map set corresponding to the 3D label as a first part output of a second expected output and with a joint point depth information map set corresponding to the 3D label as a second part output of the second expected output, wherein the training all of the channels of the output layer of the basic 3D joint point regression model, with the sample image with the 3D label as the second input, and with the joint point heat map set corresponding to the 3D label as the first part output of the second expected output and with the joint point depth information map set corresponding to the 3D label as the second part output of the second expected output, comprises:
training all of the channels of the output layer of the basic 3D joint point regression model, with the sample image with the 3D label as the second input, with the joint point heat map set corresponding to the 3D label as the first part output of the second expected output and with the joint point depth information map set corresponding to the 3D label as the second part output of the second expected output, with a weighted value of a first loss function corresponding to the sample image with the 3D label as a loss function corresponding to the first part output of the second expected output, and with a weighted value of a second loss function corresponding to the sample image with the 3D label as a loss function corresponding to the second part output of the second expected output, the first loss function being different from the second loss function.

* * * * *